US009423231B2

(12) United States Patent
Fernandez Sanchez et al.

(10) Patent No.: US 9,423,231 B2
(45) Date of Patent: Aug. 23, 2016

(54) POSITIONING DEVICE FOR THE SADDLE OF A BICYCLE

(71) Applicants: Jose Luis Fernandez Sanchez, Oñati (ES); Ion Oregui Unamuno, Soraluze (ES)

(72) Inventors: Jose Luis Fernandez Sanchez, Oñati (ES); Ion Oregui Unamuno, Soraluze (ES)

( * ) Notice: Subject to any disclaimer, the term of this patent is extended or adjusted under 35 U.S.C. 154(b) by 103 days.

(21) Appl. No.: 14/361,675

(22) PCT Filed: Nov. 28, 2012

(86) PCT No.: PCT/EP2012/073831
§ 371 (c)(1),
(2) Date: May 29, 2014

(87) PCT Pub. No.: WO2013/079526
PCT Pub. Date: Jun. 6, 2013

(65) Prior Publication Data
US 2014/0338207 A1 Nov. 20, 2014

(30) Foreign Application Priority Data
Nov. 30, 2011 (ES) .................................. 201131948

(51) Int. Cl.
*G01B 5/00* (2006.01)
*G01B 3/08* (2006.01)
(Continued)

(52) U.S. Cl.
CPC .................. *G01B 5/0002* (2013.01); *B62J 1/00* (2013.01); *G01B 3/08* (2013.01); *G01B 3/563* (2013.01)

(58) Field of Classification Search
CPC ............ G01B 5/00; G01B 5/008; G01B 3/08; G01B 3/04

USPC .................... 33/512, 515, 613, 503, 549, 809
See application file for complete search history.

(56) References Cited

U.S. PATENT DOCUMENTS 3,664,027 A * 5/1972 Fritz .................. A63B 22/0605
33/515
6,470,591 B2 10/2002 Rutkowski et al.
(Continued)

FOREIGN PATENT DOCUMENTS

JP 2000009401 A 1/2000

OTHER PUBLICATIONS

International Search Report and Written Opinion of the International Search Authority, International Application No. PCT/EP2012/073831, dated Feb. 20, 2013, pp. 1-11, European Patent Office, Rijswijk NL (Written Opinion from EPO, Munich, DE).
(Continued)

*Primary Examiner* — Yaritza Guadalupe-McCall
(74) *Attorney, Agent, or Firm* — Edell, Shapiro & Finnan LLC (57) ABSTRACT

A positioning device for positioning the saddle of a bicycle that includes a measuring pole and an adaptor positioned at an end of the measuring pole for coupling the end to the pedal crankshaft of the bicycle. The positioning device also includes a positioning assembly with a base that is configured to be supported on the saddle. An articulation assembly couples the base with the measuring pole. The base is slideable along the measuring pole and has a main plate that is capable of being supported on the saddle. The base includes a front stop adapted for abutting a front end of the saddle. The positioning device being adapted for incorporating an angle of inclination measuring device for measuring the angle of inclination of the measuring pole.

22 Claims, 8 Drawing Sheets

(51) Int. Cl.
*G01B 3/56* (2006.01)
*B62J 1/00* (2006.01)

(56) References Cited

U.S. PATENT DOCUMENTS

| | | | |
|---|---|---|---|
| 6,839,976 B2 * | 1/2005 | Winkenbach | B25H 1/0014 33/288 |
| 7,526,874 B2 | 5/2009 | Okura et al. | |
| 2008/0196263 A1 | 8/2008 | Okura et al. | |
| 2009/0025240 A1 * | 1/2009 | Taylor | A61B 5/1071 33/512 |
| 2009/0126211 A1 | 5/2009 | Mandaric | |
| 2014/0338207 A1 * | 11/2014 | Fernandez Sanchez | G01B 3/08 33/613 |

OTHER PUBLICATIONS

Spanish Search and Written Opinion dated Sep. 25, 2013 performed by the Spanish Patent and Trademark Office for Spanish priority application No. 201131948, pp. 1-6, Madrid Spain.

Partial English Translation of Spanish Written Opinion dated Sep. 25, 2013 performed by the Spanish Patent and Trademark Office for Spanish priority application No. 201131948, pp. 1-6, Madrid Spain.

* cited by examiner

POSITIONING DEVICE FOR THE SADDLE OF A BICYCLE

CROSS-REFERENCE TO RELATED APPLICATIONS

The present application relates to and claims the benefit and priority to International Application PCT/EP2012/073831 filed Nov. 28, 2012, which relates to and claims the benefit and priority to Spanish Patent Application No. 201131948 filed Nov. 30, 2011.

TECHNICAL FIELD

The present invention relates to measurement devices, and more particularly to positioning devices for positioning the saddle of a bicycle.

BACKGROUND

Positioning devices for positioning the saddle of a bicycle, and particularly for measuring and adjusting the height and setback of the saddle of a bicycle, are known in the state of the art.

In a bicycle, the height of the saddle is the distance between the upper part thereof and the pedal crankshaft where the pedals are supported, and setback is the distance of the tip of the saddle with respect to the vertical passing through the pedal crankshaft. To measure said parameters, known devices of the state of the art comprise a measuring pole having a measurement sector along its length, in which there are arranged measurement indications, normally markings of the decimal metric system. At the lower end of the measuring pole, in an opening close to said end traversing the measuring pole, there is arranged an adaptor which allows connecting it at one end with the measuring pole and allows coupling it at the other end to the bicycle. This coupling is performed with one of the ends of the pedal crankshaft of the bicycle. Along the length of the measuring pole there is arranged a positioning assembly perpendicular to the measuring pole comprising an element, normally a rod-like element, and articulated elements allowing the attachment at one end with the rod and at the other end with the measuring pole. These articulated elements allow disassembling the rod from the assembly, and on the other hand, allow the assembly to slide along the measuring pole. The rod can thus move along the measuring pole until it comes to a position in which it is supported at a point in the upper part of the saddle of the bicycle.

Patent application JP2000009401 A describes a positioning device for positioning the saddle of a bicycle which allows measuring the height and the angle of inclination with respect to the horizontal plane of the saddle of the bicycle. It comprises the elements described above with the difference that the positioning assembly comprises a U-shaped rod at its end which is supported at two points in the upper part of the saddle. This U-shaped rod is attached to the measuring pole such that it can rotate about its axis. The device also comprises an angle measuring indicator which is arranged in the measuring pole attached to the articulated element of the positioning assembly, with a dial rotating in the angle measuring indicator with the rotation of the U-shaped rod. The device also comprises a securing assembly which allows the attachment between the measuring pole and the frame of the bicycle at a fixed point of said frame. The measuring pole comprises an apparatus showing the measurement in the measurement sector which indicates the height measurement of said saddle when the positioning assembly is slid for arranging the U-shaped rod on the upper part of the saddle. At the same time upon positioning the U-shaped rod on the saddle, according to its inclination with respect to the horizontal, the dial is rotated showing the angle of inclination of the saddle with respect to the horizontal plane in the angle measurement indicator.

U.S. Pat. No. 7,526,874 B2 describes a positioning device for positioning the saddle of a bicycle which comprises the elements described above, and further comprises a securing assembly. Said securing assembly comprises a securing element and articulated elements allowing the attachment at one end with the securing element and at the other end with the measuring pole. These articulated elements allow moving the securing element along the measuring pole such that the measuring pole can be attached to the bicycle by means of said securing element at the desired point of the inclined bar of the bicycle structure. The articulated element attaching the rod to the measuring pole has, at the height of the longitudinal axis of the rod, a slot which allows viewing the measurement indications of the measuring pole. In this manner and for measuring the height of the saddle, with the positioning device coupled to the bicycle by means of the adaptor and the securing element, the rod is arranged in the upper part of the saddle and the height is measured.

The measuring pole is arranged vertically for measuring the setback of the saddle with the aid of a commercial spirit level. The securing element is attached to the horizontal bar of the bicycle structure and the rod is slid until it is located at the height of the saddle. The distance between the rod and the tip of the saddle is measured with the aid of a meter, thus obtaining the setback measurement.

SUMMARY OF THE DISCLOSURE

According to one implementation a positioning device is provided that comprises a measuring pole, an adaptor positioned at one end of the measuring pole for coupling said end of the measuring pole to the pedal crankshaft of the bicycle, a measuring means for determining the distance between the pedal crankshaft of the bicycle and the saddle, and a positioning assembly comprising a base supported on the saddle for the measurement, and articulated elements which allow the attachment of the base with the measuring pole and the sliding of said base along the measuring pole. The base of the positioning assembly comprises a main plate supported on the saddle and a front stop arranged abutting with the tip of the saddle for the measurement. The device is adapted for incorporating a means for measuring the angle of inclination of the measuring pole, such that the setback of the saddle is determined depending on said angle.

The device does not need a securing assembly which allows attaching it to the frame of the bicycle, rather the device is coupled to the bicycle only with the adaptor arranged at one end of the measuring pole, and with the positioning assembly arranged on the saddle such that fewer elements are used, it allows greater versatility since the device can be positioned without being limited by attachments to the frame of the bicycle, or without disassembling the wheels of the bicycle, and allows quicker coupling of the device to the bicycle.

The base is completely supported on the surface of the saddle which, together with the arrangement of the front stop in the tip thereof, creates greater reliability and precision in the repetitive measurements of the height and the setback of the saddle, the position of the saddle is thus more precisely defined.

The setback of the saddle is measured with the aid of the means for measuring the angle of inclination of the measuring pole, which allows making the measurements of the state and inclination of the ground where the bicycle is supported independent, since it allows setting to zero with the existing inclination, and that zero is subsequently transferred to the measurements in the bicycle. An ideal situation for a cyclist occurs when the angle forming the line attaching the saddle with the pedal crankshaft with respect to the horizontal of the bicycle can be arranged at an angle corresponding to the position of best cyclist performance, and this corresponding to a value of the setback allowed by international organizations. That angle can be determined with the means for measuring the angle arranged in the measuring pole, and if the height measurement of the saddle has been taken and the accuracy of the setback is to be known, nothing more than a simple trigonometric operation has to be performed, in which the angle is linked to the height of the saddle and the length of the saddle. This way of calculating the setback of the saddle is much more precise than that performed with the devices of the state of the art, further allowing arranging the saddle at the suitable height and angle for obtaining the best cyclist performance, taking into account the influence that the most accurate positioning and the suitable angle of the saddle of the bicycle has in this sport.

These and other advantages and features will be evident in view of the drawings and the detailed description.

DETAILED DESCRIPTION

The positioning of the cyclist on a bicycle is one of the first steps to be taken in cycling, so much so that the initial idea of said positioning must even define the purchase itself or at least adapting the bicycle to the morphological characteristics of the cyclist. The position of the cyclist on the bicycle must involve a situation of equilibrium between different sections which together intervene directly in the physical performance of the cyclist. However, although it is important in all cases, these criteria truly have a strong influence in the case of experienced cyclists and even more in the case of professional cyclists.

Until recently, the positioning of a cyclist on a bicycle has been adjusted by means of trial and error, i.e., by changing the different bicycle measurements until adapting it to the cyclist. It has also been adjusted with the aid of measuring tapes and plumb lines for adjusting the most important measurements such as height and setback of the saddle. This involved excessive time consumption and also many errors both during the first and subsequent measurement adjustments.

It was obvious that the suitable measurements for a cyclist on his/her bicycle could not be repeated because the errors involved variations of several millimeters. Development in the state of the art gave rise to measurement and adjustment devices such as those defined in the section of the state of the art of the present application. However, said devices still lack precision because the referencing rods are supported on the saddle at one or two points on only one line and their positioning at a specific point along the length of the saddle is difficult with said means; therefore, the height measurement may not be very precise and the setback measurement is taken with the aid of a measuring tape, whereby it is not a precise measurement either.

Both experienced road cyclists and especially professional cyclists obey the technical regulations and specifications defined by the official organization, the International Cycling Union (UCI—Union Cycliste Internationale), which is the organization responsible for organizing, regulating and controlling competitive cycling. The UCI establishes technical and specific regulations determining the characteristics and measurements that a bicycle used by the cyclist must have. In the positioning of the cyclist on the bicycle, the cyclist has three support points: the pedals, the handlebar and the saddle. The device described below is used for taking measurements and adjusting one of these support points, the saddle. As will be described below, said device is also used for calibrating the pedal crankshaft height and the distance from the end of the handlebar to the vertical passing through the pedal crankshaft.

The UCI limits the possibilities of adjusting the saddle in at least three points:
1. The support surface of the saddle must be in a horizontal plane.
2. The length of the saddle must be at least 24 centimeters (cm) and at most 30 cm in road cycling, and 31 cm in triathlon.
3. The tip of the saddle must be at least 5 cm behind the vertical passing through the pedal crankshaft.

These points are applicable to bicycles intended for road cycling and time trials, but are not applicable to bicycles intended for triathlon races and sprint races, keirin races, 500 meter (m) races and kilometer races which have a specific regulation. Similarly said points are applicable to bicycles intended for cyclists whose morphology, morphology being understood as relating to the height or to the length of the limbs of the cyclist, can be considered as within the normal standard, whereas cyclists who are not within said standard and can justify same, will be subjected to specific tests by cycling event organizers. Taking into account all these aspects, it is very important to consider the morphological characteristics of the cyclists, these being the total height of the cyclist and the length of his/her legs, specifically his/her height up to the crotch "e", as well as the fit thereof to the posture adopted by the cyclist on the bicycle, which translates into defining the height "h" of the saddle adjusted to the height of the crotch, and the angle of inclination or angle "α" formed by the height h with the horizontal, which is ultimately marking the posture of the cyclist on the bicycle.

The positioning device 1 of the saddle 3 of a bicycle 2 is suitable for complying with the requirements mentioned above. As can be seen in the perspective views of FIGS. 1 and 2, in one embodiment the device 1 comprises a measuring pole 10 with a measurement sector 11 defined in part of the length of said measuring pole 10, suitable for taking measurements with precision; said measuring pole 10 has a measuring means 14 arranged on the measurement sector 11 which allows measuring and viewing the measurement of the distance taken in the measuring pole 10 between a pedal crankshaft 4 which the bicycle 2 has in the lower part of its frame 5, and the saddle 3. The measuring pole 10 comprises a lower end 12, close to which there is arranged an opening 13 traversing the measuring pole 10; an adaptor 20 is arranged in said opening 13 which allows its connection at one end with the measuring pole 10, and allows its coupling at the other end to the bicycle 2. The device 1 comprises a positioning assembly 30 comprising a base 31 supported on the saddle 3 on its entire surface and is used for taking measurements, and articulated elements 32 which allow the attachment of the base 31 with the measuring pole 10; said articulated elements 32 encircle the measuring pole 10, surrounding it, and allow the positioning assembly 30 to slide along said measuring pole 10. The base 31 comprises a main plate 33 supported on the saddle 3, a substantially perpendicular front stop 37, and located at one end 38 of the main plate 33 supported on and abutting with the tip of the saddle 3, the positioning device being adapted for incorporating a means 70 for measuring the angle of inclination "α" of the measuring pole 10 with respect to the horizontal of the support of the bicycle 2, such that the setback "r" of the saddle 3 is determined depending on said angle of inclination "α", on the distance or height "h" between the pedal crankshaft 4 and the saddle 3, and on the length "d" of the saddle 3.

Figure 3:
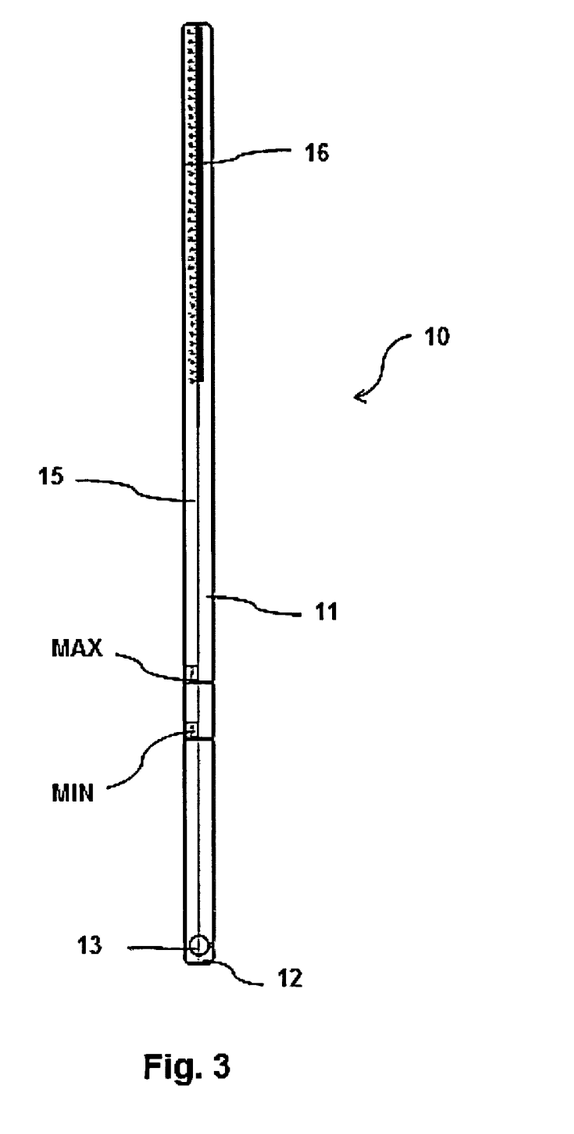
FIG. 3 shows a plan view of the measuring pole of the embodiment of FIG. 1.

The measuring pole 10 is shown in a plan view in FIG. 3. It is a measuring pole of approximately one meter long, in which an opening 13 has been made close to the lower end 12 and where the adaptor 20 is arranged; a zero point centered in the opening 13 has been defined, with reference to which an accurate reference for taking the measurements is achieved. The measurement sector 11 comprises indications marked with the text MIN and MAX along with a stripe which are referenced to the lower end 12 of the measuring pole 10; the functionality of said indications will be defined below. The measuring pole 10 can also comprise a line 15 marked in the measurement sector 11, running longitudinally along the measuring pole 10 passing through zero point; its functionality will also be explained below. The measuring pole 10 can also comprise indications 16 of a metric system marked in the measurement sector 11, as shown in FIG. 3, said indications 16 being referenced to the zero point defined in the measuring pole 10, and the functionality of which will be explained below.

Even though the measuring pole 10 in the embodiment described is a physical measuring pole, the possibility that said measuring pole 10 is a "virtual measuring pole" performing the same functions as those of a physical measuring pole, i.e., the function of referencing the position of the saddle 3 with respect to the pedal crankshaft 4, and the function of measuring the distance between the pedal crankshaft 4 and the saddle 3 together with the measuring means 14, is also contemplated within the scope of the invention. Therefore, a laser measuring apparatus, for example, could be incorporated as a measuring means 14 and at the same time as a "virtual measuring pole" for performing that dual function, in which case it would not be necessary to physically attach the pedal crankshaft 4 and the saddle 3.

Figure 1:
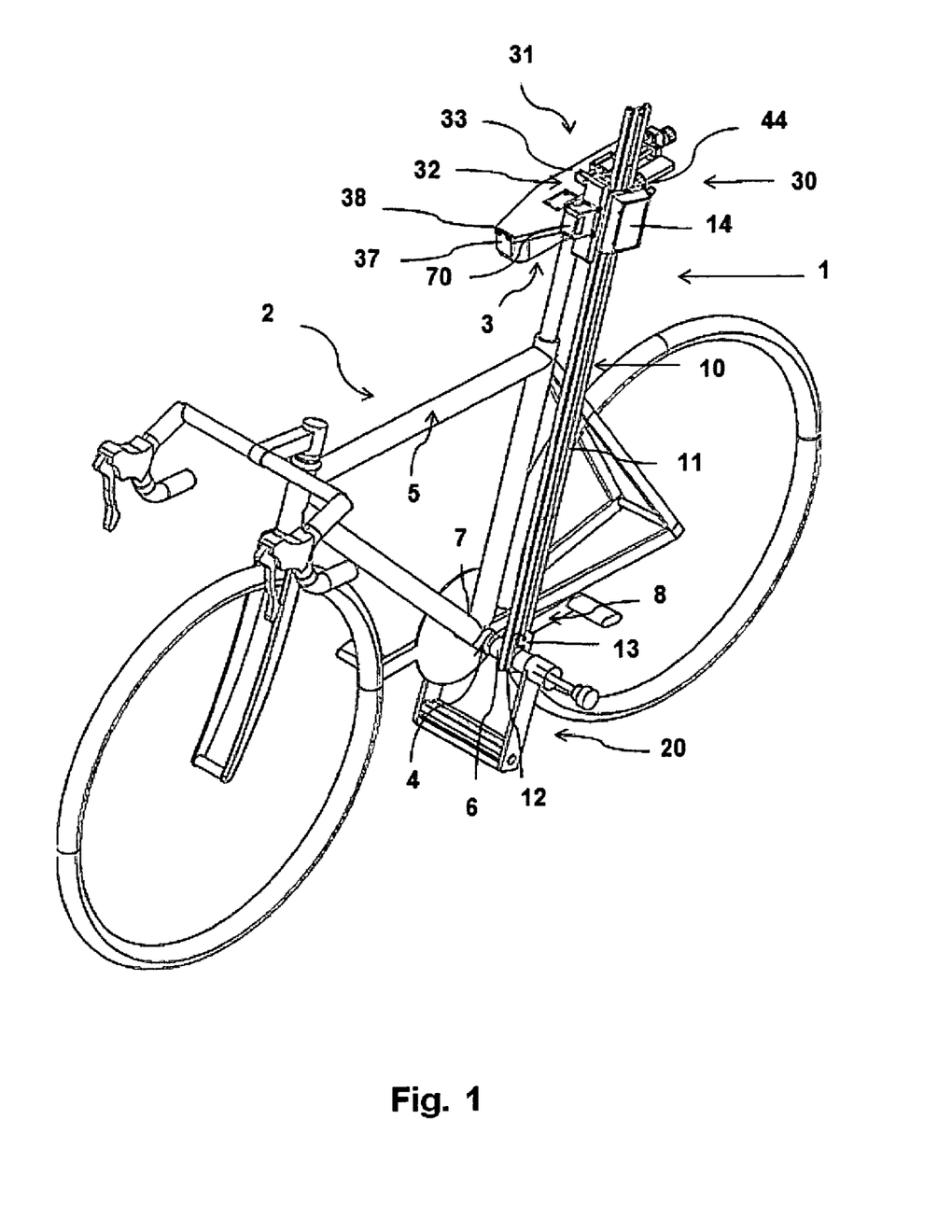
FIG. 1 shows a perspective view of an embodiment of a positioning device mounted on a bicycle.
Figure 2:
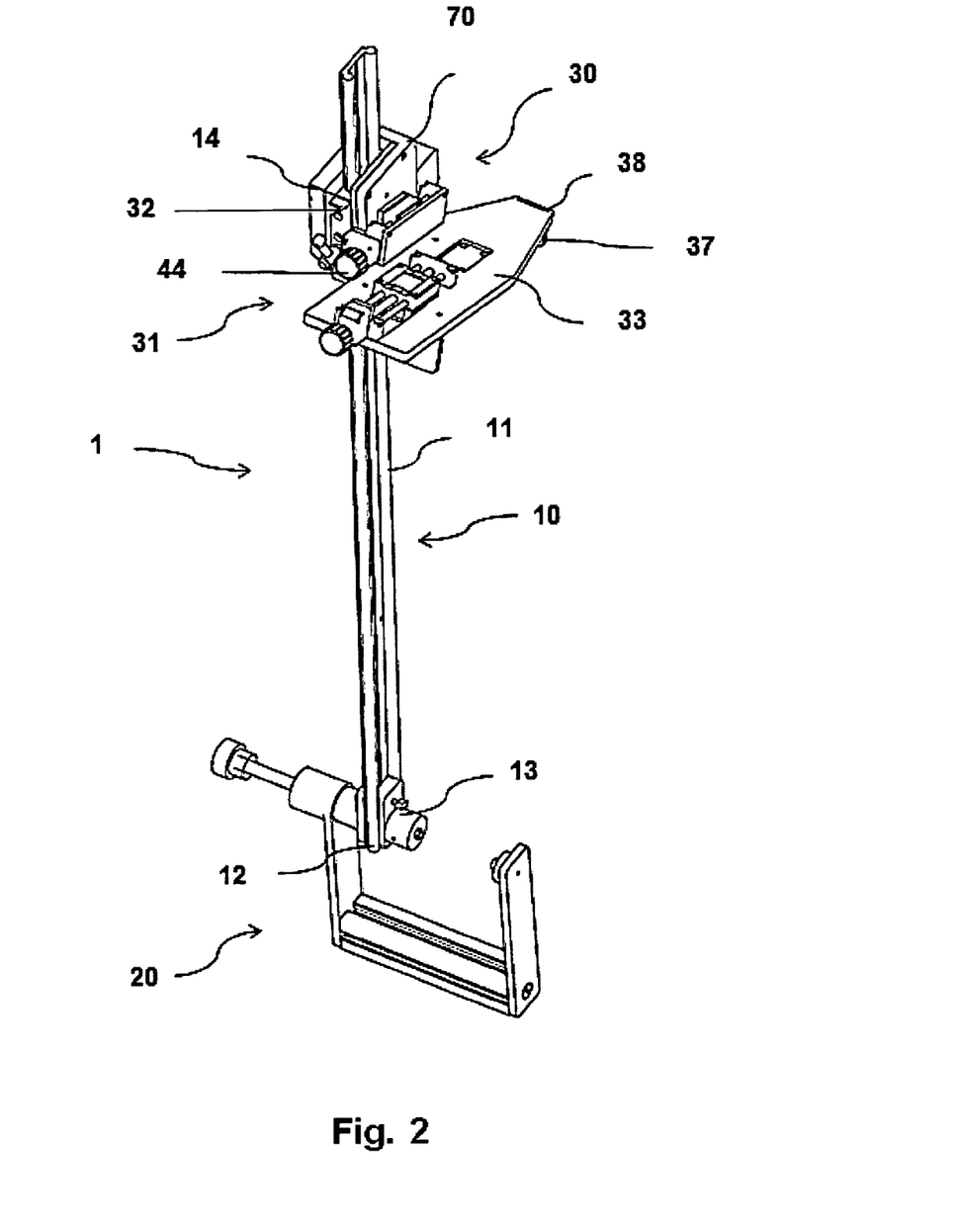
FIG. 2 shows another perspective view of the embodiment of FIG. 1.
Figure 4:
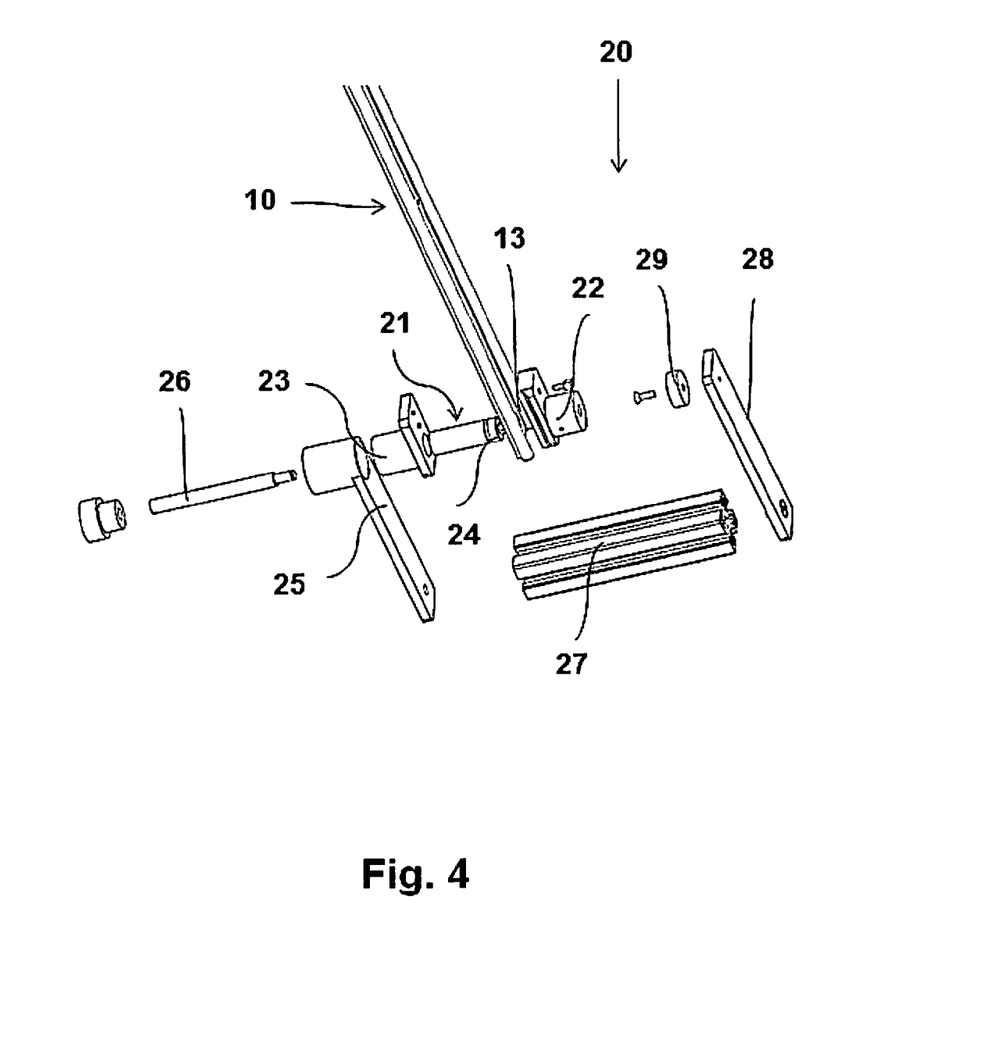
FIG. 4 shows an exploded perspective view of the adaptor of the embodiment of FIG. 1.

FIG. 4 shows an exploded, perspective view of the adaptor 20 of the device 1, and FIG. 2 shows a perspective view of the device 1 comprising the adaptor 20 mounted on and connected to the measuring pole 10. The adaptor 20 comprises a removable centering apparatus 21 which is inserted in the opening 13 of the measuring pole 10, matching the axis of the centering apparatus 21 with zero point of the measuring pole 10 once the adaptor 20 is mounted on and connected to the measuring pole 10. Said centering apparatus 21 is fitted to the measuring pole 10 by means of two bushings, a movable bushing 22 and a support bushing 23 surrounding the measuring pole 10, connecting the assembly of the adaptor 20 to the measuring pole 10; the movable bushing 22 and support bushing 23 allow the passage of the centering apparatus 21, and the support bushing 23 allows the protrusion of an end 24 of the centering apparatus 21. The adaptor 20 comprises a support 25 housing the movable bushing 22 at one end, said housing having therein a threaded hole in which a threaded shaft 26, which allows attaching the support 25 with the movable bushing 22, is introduced. At the other end of the support 25 there is attached a divider 27 which allows obtaining the gap required by the adaptor 20 for coupling to the bicycle 2, at the side opposite where the measuring pole 10 is arranged. At the other end of the divider 27 there is attached the end of a flat bar 28, the opposite end of which is attached to a removable elastic means 29 arranged on the face of the flat bar 28 facing the bicycle 2. In this embodiment the elastic means 29 has a cylindrical shape with a planar face supported on the flat bar 28, and the opposite face has an inverted cone shape. The elastic means 29 comprises, in the center of the cylinder, a through hole which allows housing the means for fixing with the flat bar 28; once the elastic means 29 is attached with the flat bar 28, and the adaptor 20 is connected to the measuring pole 10, the longitudinal axis of the cylinder of the elastic means 29 matches the axis of the centering apparatus 21 and therefore matches the zero point of the measuring pole 10. As shown in FIG. 1, the pedal crankshaft 4 has, coupled thereto, cranks 8 the ends of which are coupled to the pedals; said pedal crankshaft 4 comprises two ends 6 and 7, the end 6 comprising a housing with an attachment element (not shown in the figures) in which the end 24 of the centering apparatus 21 is introduced, being coupled to said attachment element.

For coupling the device 1 to the bicycle 2, the end 24 of the centering apparatus 21 is couple to the attachment element in the housing of end 6 of the pedal crankshaft 4, and the elastic means 29 is coupled to end 7 of the pedal crankshaft 4 which, due to its elasticity, does not scratch the bicycle and adapts to the different possible ends of the pedal crankshafts. Similarly and for improving the versatility of the device 1, since the bicycles can have different terminations of the pedal crankshafts 4 attached with the cranks 8 due to the possible different attachment elements housed at the ends, the centering apparatus 21 coupled to said different terminations of the pedal crankshafts 4 has different embodiments with different ends 24 suitable for the different attachment elements of the pedal crankshafts 4. This, along with the fact that the centering apparatus 21 can be removed from the adaptor 20, allows the device 1 to adapt to the different existing types of bicycles.

Figure 5:
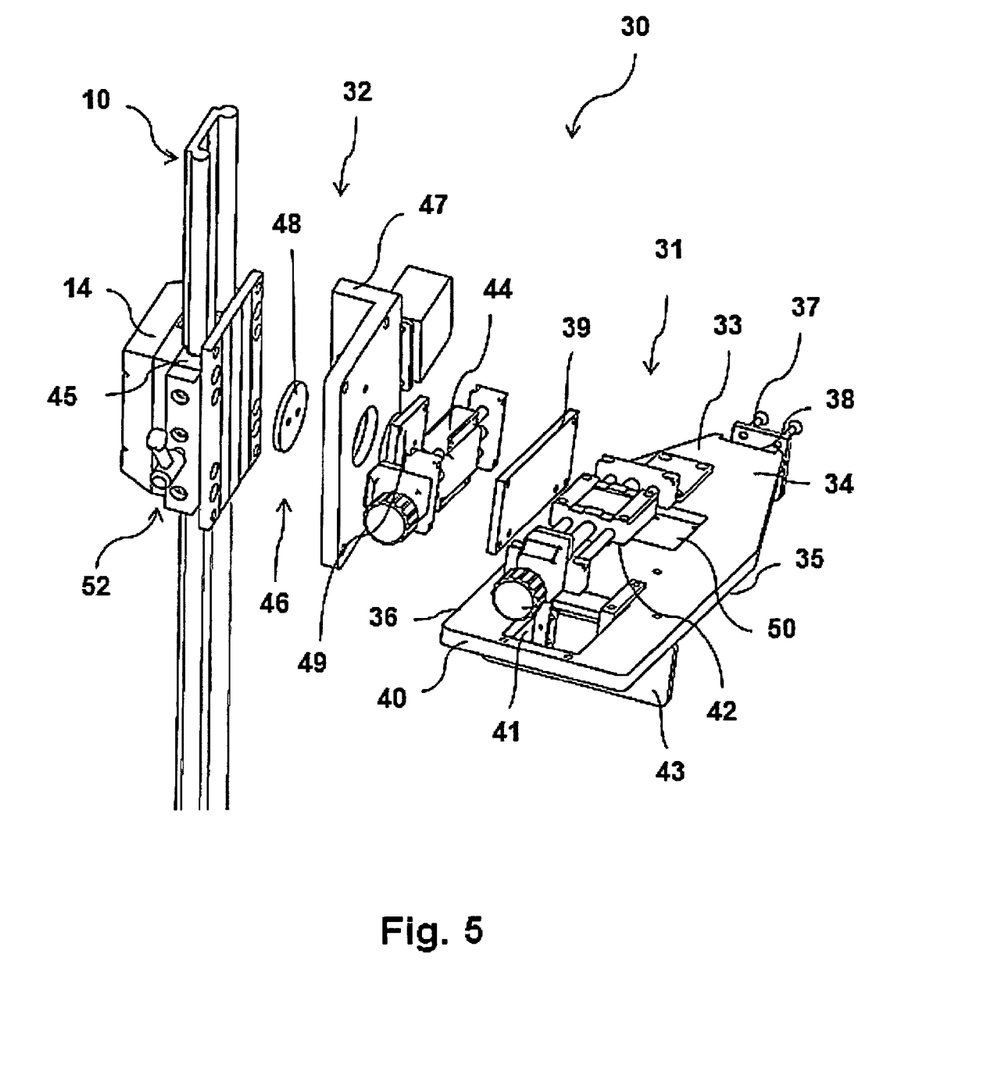
FIG. 5 shows an exploded perspective view of the positioning assembly of the embodiment of FIG. 1.
Figure 6:
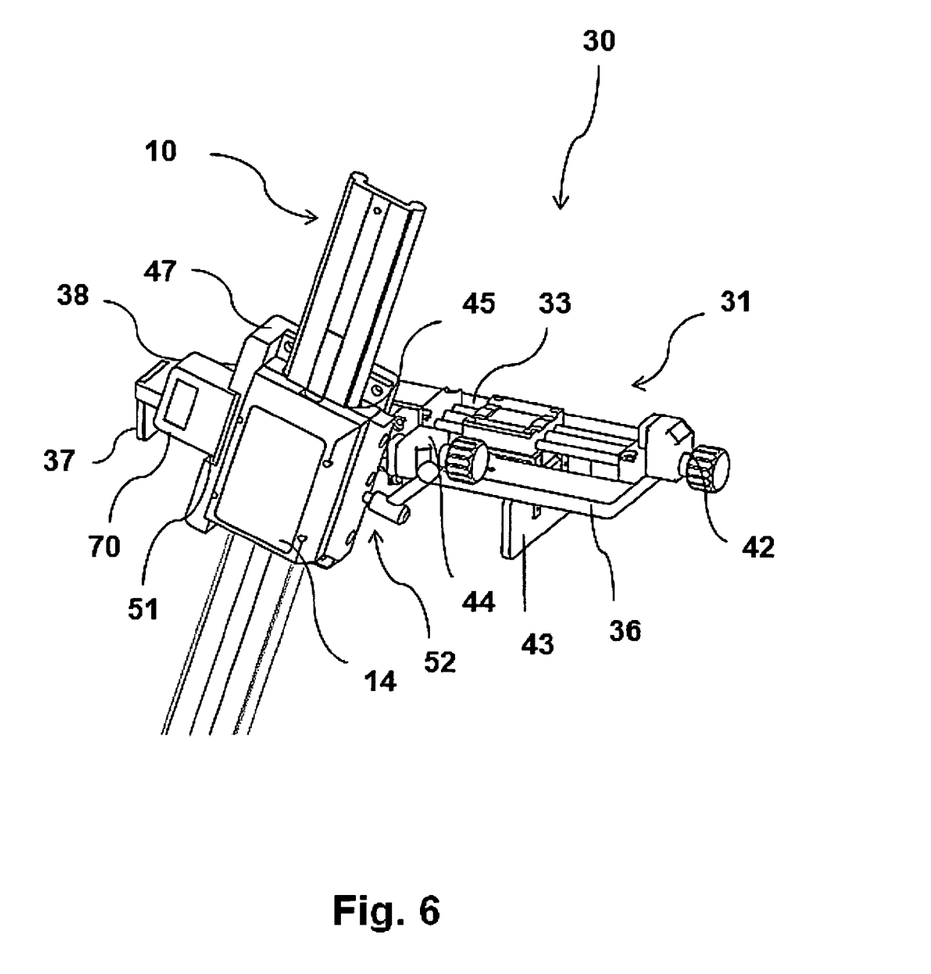
FIG. 6 shows a perspective view of the positioning assembly of the embodiment of FIG. 1 mounted on the measuring pole.

FIG. 5 shows an exploded, perspective view of the positioning assembly 30 of the device 1 and FIG. 6 shows a perspective view of the positioning assembly 30 connected to the measuring pole 10, and FIG. 2 shows another perspective view of the positioning assembly 30. The positioning assembly 30 may be perpendicular to the measuring pole 10 and comprises, in this embodiment, a base 31 supported on the saddle 3 on its entire surface or a portion thereof and used for taking measurements, and articulated elements 32 which allow the attachment of the base 31 with the measuring pole 10; said articulated elements 32 encircle the measuring pole 10, surrounding it, and allow the positioning assembly 30 to slide along said measuring pole 10.

The base 31 may comprise a rectangular-shaped main plate 33, being a trapezoidal-shaped plate in the embodiment shown in the figures, adapted to the elongated shape of the saddle 3; the main plate 33 comprises an upper part 34, a lower part 35, and a side face 36 in the side which is attached with the articulated elements 32. The base 31 also comprises a front stop 37 that according to one embodiment is substantially perpendicular to the main plate 33 and attached to said plate 33 at one end 38, and a side plate 39 that may be substantially perpendicular to the main plate 33 and attached to the plate 33 in the side face 36. The main plate 33 comprises another end 40, and close to said end 40 there is arranged an opening 41 traversing said main plate 33; said opening 41 has a rectangular shape with the longer side in the direction of the side face 36.

In the upper part 34 of the main plate 33 there is arranged a displacement device 42 attached to the plate 33, allowing movement in the direction of the longitudinal axis of the main plate 33, and which is covering the opening 41. In the lower part 35 of the main plate 33 there is arranged a rear stop 43 that may be substantially perpendicular to the main plate 33 and attached to the displacement device 42 by means of brackets; said rear stop 43 is a rectangular plate with the longer side in a direction perpendicular to the longitudinal axis of the main plate 33. Therefore, when the rear stop 43 is to be moved, the displacement device 42 also moves, the rear stop 43 being moved in the plane of the main plate 33 and in the direction of the longitudinal axis of said main plate 33, and therefore in the direction of the longitudinal axis of the saddle 3. In the side face 36 of the main plate 33 and attached to the side plate 39 there is arranged a displacement device 44 which allows movement in the direction of the longitudinal axis of the main plate 33. In the main plate 33 in its upper part 34 between the end 38 and the displacement device 42, there is arranged a substantially planar housing 50 made of ferric material. The upper part 34 of the main plate 33 can also comprise marked stripes, which are referenced to the position where the front stop 37 is attached with the main plate 33 at the end 38; the functionality of said indications will be defined below. The displacement device 44 of the base 31 allows positioning the measuring pole 10 in the direction of the longitudinal axis of the saddle 3, at the point of the saddle which has been defined, with total precision, since the measuring pole 10 and the base 31 are connected by means of the articulated elements 32; this position normally matches half the length "d" of the saddle 3, because this is the position in which the cyclist obtains his/her best physical performance, since his/her posture on the bicycle is the most suitable one. The height "h" of the saddle 3 is measured in this position, obtaining a more precise measurement than that obtained with the devices of the state of the art.

In the embodiment depicted in the figures, the device 1 comprises a measuring means 14 which is arranged on the measuring pole 10 and which allows measuring and viewing the measurement of the distance taken in the measuring pole 10 between the pedal crankshaft 4 and the saddle 3; this measuring means 14 is a digital measurement system comprising a U-shaped part 45 which encircles the measuring pole 10, and allows sliding along same. This digital measurement system is referenced to the zero point defined in the measuring pole 10, such that as it moves with the positioning assembly 30 along the measuring pole 10, it indicates the measurement taken digitally at the point in which said measuring pole 10 is located. This digital measurement system is preferably a commercial device already existing on the market, such as a model from the IGUS DryLin® W WKM-11 family, for example, which allows taking highly accurate measurements in tenths of a millimeter or even with greater precision.

In another embodiment, the device 1 comprises a measuring means 14 using the indications 16 of a metric system marked in the measurement sector 11 of the measuring pole 10, as shown in FIG. 3, said indications 16 being referenced to the zero point defined in the measuring pole 10. To take the measurements, there is arranged on the part 45 encircling the measuring pole 10 a wedge-shaped part (not shown in the figures), with the part inclined towards the center of the measuring pole 10, and with an arrow marked on the surface thereof for facilitating the reading of the measurement, thus forming the measuring means 14.

The articulated elements 32 comprise a set of elements attached to one another, allowing certain movements, and attaching the base 31 and the measuring pole 10. The measuring means 14 defined above, comprising the U-shaped part 45 has, attached to the base of said U-shaped part, a rotating system 46 which allows rotating the base 31 with respect to the horizontal plane and retaining it in a position which allows it to be supported on the entire surface of the saddle 3. Said rotating system 46 comprises an L-shaped plate 47, which is attached to the part 45 on the long face of the L-shaped plate, and acts as a rotating base; in said long face of the L-shaped plate there is a cylindrical housing traversing the face, the inside of which on the side of the part 45 there is a circular, diameter reducing recess. Between the part 45 and the plate 47 there is arranged a washer 48, one of the faces of which has a cylindrical flange which is introduced into the recess of the housing of the plate 47 and supported on the part 45, and the other face is at the same level as the face of the plate 47. In the plate 47, in the face opposite the face for attachment with the part 45 there is attached a part 49 acting as an axis of rotation; said part 49 is a plate with a cylinder on one of its faces, said cylinder being introduced in the cylindrical housing of the plate 47 and attached to the end of the washer 48. The part 49 is attached through the plate with the displacement device 44, the opposite face of which is attached to the side plate 39 of the base 31; therefore, the attachment between the base 31 and the measuring pole 10 is achieved with the articulated elements 32, allowing the base 31 to rotate with respect to the horizontal plane. Even though it is not depicted in the figures, the rotating system 46 comprises a restraining system which allows restraining the rotation and adjusting it in the desired position for coupling the base 31 in the saddle 3.

Attached to the opposite side face of the part 45 supporting the short face of the L-shaped part 47, the articulated elements 32 comprise a set of restraining assembly 52 which allows adjusting and retaining the positioning assembly 30 in a specific position while it slides along the measuring pole 10, and thus enabling taking a measurement. Said restraining assembly 52 comprises an operating control with a threaded end, screwed into the side face of the part 45 in a hole traversing said face, contacting the end of the operating control with a side face of the measuring pole 10, such that when the control rotates, it tightens or loosens pressure on the side face of the measuring pole 10, and the part 45, and whereby the positioning assembly 30 can be retained or can slide. On the opposite side face of the part 45 supporting the short face of the L-shaped plate 47, there is arranged on this face a substantially planar housing 51 made of ferric material.

To enable the horizontal movements of the rear stop 43 and of the articulated elements 32 and thereby the measuring pole 10 respectively, the displacement devices 42 and 44 used in the base 31 are, in this embodiment, commercial linear tables with a leadscrew existing on the market, such as a model from the IGUS DryLin® SHT SHT-01-06 family, for example, which allows taking highly accurate measurements in tenths of a millimeter or even with greater precision. These devices can include elements such as a crank which allows precisely controlling the movement, and allows restraining and adjusting the movement at a specific point. It can also include a position indicator which allows viewing the measurement in which the device has been positioned; in the case of the displacement devices 42 and 44 the zero reference on which the position indicator of said devices is positioned is the attachment of the front stop 37 with the main plate 33 at end 38, which is the point where the tip of the saddle 3 is supported.

The device 1 must be coupled to the bicycle 2 to measure the height "h" of the saddle 3. To couple the device 1 to the bicycle 2, the adaptor 20 is first coupled, the end 24 of the centering apparatus 21 being coupled in the housing of the end 6 of the pedal crankshaft 4, and the elastic means 29 is coupled to the end 7 of the pedal crankshaft 4. Since bicycles can have different attachment elements attaching the cranks with the pedal crankshaft, the centering apparatus 21 has different embodiments with different ends 24 suitable for the different attachment elements existing in bicycles on the market, the suitable one being arranged. The positioning assembly 30 is then coupled to the saddle 3 of the bicycle 2; to that end, the restraining assembly 52 is unlocked and the positioning assembly 30 is slid along the measuring pole 10 until the base 31 is located on the saddle 3, with the front stop 37 supported against the tip of the saddle 3. The rotating system 46 is then unlocked and released, such that the base 31 can rotate about the axis of rotation of the rotating system 46 with respect to the horizontal plane, and the main plate 33 is supported on the saddle 3. The rotating system 46 is locked and the crank of the displacement device 42 is then unlocked, the rear stop 43 being slid until it abuts with the rear part of the saddle 3, such that the base 31 is completely positioned on the saddle 3, and the displacement device 42 is then locked, the measurement of the length "d" of the saddle 3 being able to be viewed. Next, the displacement device 44 is unlocked with the crank and the measuring pole 10 is slid until reaching the length "d" of the saddle 3 that is most suitable for taking the measurement of height "h", said length "d" being viewed in the position indicator of the displacement device 44; this length "d" of the saddle 3 is usually half the total length "d", which is the point at which the cyclist is best settled on the bicycle and can obtain the best physical performance. At that point both the displacement device 44 and the restraining assembly 52 are locked, being able to read the height "h" with the measuring means 14 in this embodiment.

To measure the setback "r" of the saddle 3, it is very important to consider the morphological characteristics of the cyclists, these being the full height of the cyclist and the length of his/her legs, specifically his/her height up to the crotch "e", as well as the fit thereof to the posture adopted by the cyclist on the bicycle. This translates into determining the height "h" of the saddle, which is the distance between the pedal crankshaft 4 and the highest support point of the saddle 3, equivalent to the height of the crotch "e", and the inclination or angle "α" formed by the height "h" with the horizontal, which is ultimately marking the posture of the cyclist on the bicycle. Therefore, the measurement of the setback "r" will be a result of calculating the angle "α", the regulations of the UCI necessarily being complied with, but the precise calculation of the angle "α" being what is truly important.

Figure 7:
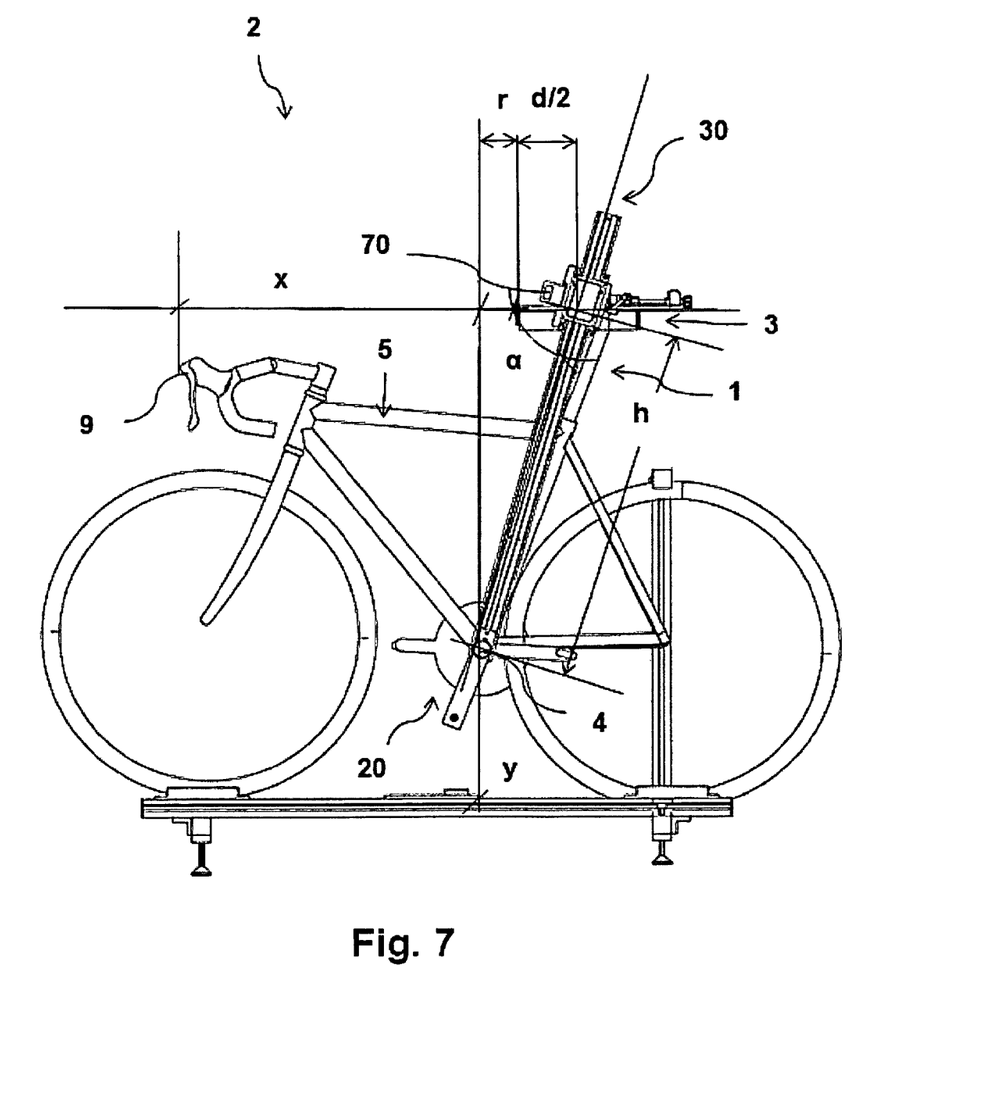
FIG. 7 shows a side view of the embodiment of FIG. 1 mounted on a bicycle.

The angle "α" is measured with the aid of the means 70; the means 70 is a commercial goniometer easily available on the market and is magnetized such that it can adhere to any surface made of ferric material, and which goniometer has the characteristics of known spirit or linear levels, but unlike them, it further allows a very easy and precise measurement of any angle. It allows making the measurements taken for the condition and inclination of the ground where the bicycle 2 is supported independent, since it allows setting the surface where the bicycle 2 is supported to zero regardless of the existing inclination and the condition of the ground, subsequently transferring that zero to the measurements on the bicycle 2. It is used for measuring height "h" and setback "r", arranging the means 70 in the housing 50 of the main plate 33 when measuring height "h", rotating the base 31 when it is released for rotation until the means 70 indicate an angle having a 0° value, and thus assuring that the base 31 is horizontal. As can be seen in FIG. 7, when measuring setback "r", the means 70 is arranged in the housing 51 of the plate 47 which is attached to the measuring pole 10, said measuring pole 10 being positioned in the arrangement for measuring height "h", being able to directly measure the angle "α" regardless of the inclination of the bicycle 2. If the setback "r" of the saddle 3 is to be known, by knowing the height "h" of the saddle 3 and the angle "α", nothing more than a simple trigonometric operation has to be performed, in which the measured height of the saddle "h" and the measured angle "α", and the length of the saddle "d" known in the process of measuring the height "h", are linked:

$$r = h \times \cos \alpha - d/2$$

as mentioned above the value d/2 being the ideal position of the cyclist on the saddle 3, and therefore the place where the height "h" and the angle "α" are measured.

If this measured angle "α" does not match the ideal angle defined as the angle for the ideal posture of a cyclist, the horizontal position of the base 31 and the height of the support of the saddle 3 in the frame 5 are modified. Since the height "h" to be obtained, equivalent to the height of the crotch "e", marks a circumference with a center in the pedal crankshaft 4, it is known that the ideal angle is at a point of said circumference; therefore, the support of the saddle 3 is moved to change its height, and the base 31 is moved horizontally with the aid of the displacement device 44 to adapt it again to half the length "d" of the saddle 3, until matching the angle sought, which angle is shown by the means 70.

The cyclists can thus compete in road races in one and the same position, i.e., with the same angle "α" and therefore in the same posture; to that end and with the preceding formula, by knowing the angle "α" and the height of the crotch "e" of each cyclist, and therefore the height "h" thereof, whether they are within the regulation can be known beforehand by knowing the value of the setback "r", this value always being the same. Similarly and for time trial races, the cyclists have the end of the saddle 3 with a minimum measurement of 5 cm defined by the UCI which, even though it is more uncomfortable, enables better physical performance over shorter time periods than road races. In this case, by knowing the "r" and the height "h", the actual angle "α" at which they would compete in this race would be known. This way of calculating the setback "r" of the saddle 3, or better still, of arranging the saddle 3 at the height "h" and angle "α" suitable for obtaining the best cyclist performance, is much more precise and suitable than that performed with the devices of the state of the art, taking into account the influence that the most accurate positioning of the saddle of the bicycle has in this sport.

Other measurements that can be taken with the device 1 are: the length "d" of the saddle 3, the height "y" of the pedal crankshaft 4 with respect to the ground, and the distance "x" of the end of the handlebar 9 of the bicycle 2 with respect to the vertical passing through the pedal crankshaft 4. The length "d" of the saddle 3 can be measured with the displacement device 42, as described in the section where the height measurement "h" was described; another way of knowing whether the length of the saddle is within UCI regulation, between the minimum of 24 cm and the maximum of 30 cm, is by arranging the base 31 on the saddle 3 with the front stop 37 and the rear stop 43 adjusted at its ends and viewing whether the rear stop 43 is located between the stripes marked on the main plate 33, which are located, respectively, at the aforementioned distances.

It can be determined if the height "y" of the pedal crankshaft 4 with respect to the ground is within UCI regulation, between the minimum of 24 cm and the maximum of 30 cm, by releasing the measuring pole 10 of the device 1, and arranging it vertically with the lower end 12 supported on the ground, and supporting the measuring pole 10 on the pedal crankshaft 4; then it can be viewed whether the pedal crankshaft 4 is located between the stripes marking the MIN and MAX of the measurement sector 11, which stripes are located, respectively, at the aforementioned distances.

It can be determined if the distance "x" of the end of the handlebar 9 with respect to the vertical passing through the pedal crankshaft 4 is within UCI regulation for time trial races, a maximum of 75 cm, by coupling the device 1 to the bicycle 2, and arranging the measuring pole 10 vertically with the aid of the means 70 positioned in the housing 51 of the plate 47, and it should mark 90°. Once the measuring pole 10 is arranged vertically and with the aid of a measuring tape, the distance between the end of the handlebar 9 and the line 15 marked in the measurement sector 11 of the measuring pole 10 is measured.

Figure 8:
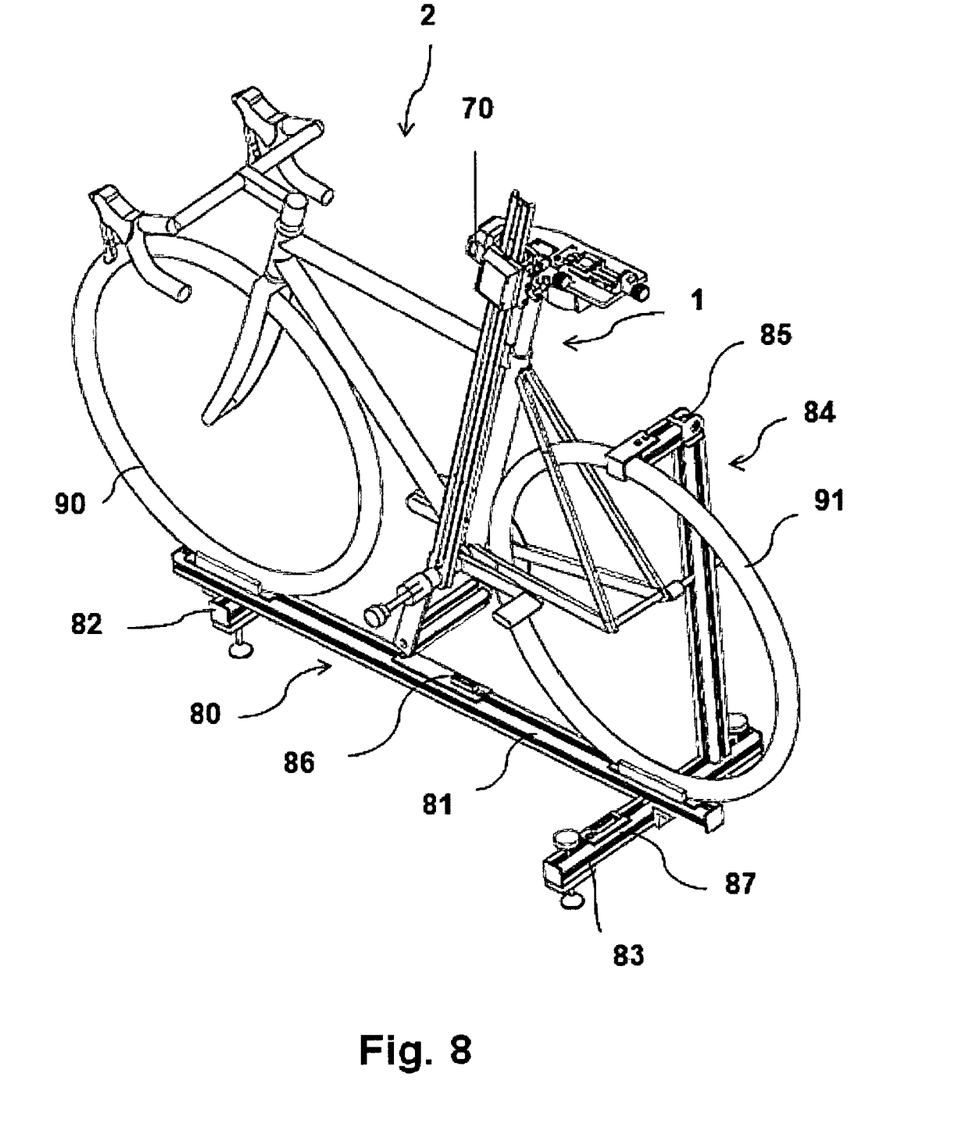
FIG. 8 shows a perspective view of the embodiment of FIG. 1 mounted on a bicycle which is supported on a support structure.

All the measurements taken and described until now have been performed with the bicycle 2 on the ground and using the device 1 directly. This is normally sufficient, but the case where the ground is very irregular and/or very inclined may arise. For said cases, it may be useful to have a support structure 80 supporting and holding the bicycle 2; as can be seen in FIG. 8, said support structure 80 comprises a longitudinal profile 81 on which the wheels 90 and 91 of the bicycle 2 are supported, and at least two transverse profiles 82 and 83 supported on the ground. The support structure 80 also comprises a holding element 84 for holding the bicycle 2, attached at one end to one of the transverse profiles 82 or 83, and at the other end to one of the wheels 90 or 91; said holding element 84 comprises at one end an articulated device 85 coupled to one of the wheels 90 or 91, which device has an elastic element which allows the holding element 85 to couple to and uncouple from the wheels 90 or 91 easily. To enable taking reliable measurements, and to enable making them independent from the conditions of the ground, the longitudinal profile 81 and at least one of the transverse profiles 82 or 83 have in its upper part substantially planar plates 86 and 87 made of ferric material, which allow housing the means 70 on the surface thereof. Therefore, and to take the measurements described above, the means 70 is arranged in the plates 86 and 87, is set to zero and measurements can be taken.

The device 1 is preferably made of aluminum, with the exception of the attachment elements, normally screws, which are preferably made of steel. A lightweight and at the same time rigid device 1 with easier handling can thus be made.

The advantages provided by the device 1 are obvious with respect to that provided by the state of the art; the device 1 does not need a securing assembly attaching it to the frame 5 of the bicycle 2 and thus stiffening it with said structure, such that fewer elements are used, it allows greater versatility since the device 1 can be positioned without being limited by attachments to the frame 5 of the bicycle 2, and quicker coupling of the device 1 to the bicycle 2.

The positioning assembly 30 of the device 1 together with the use of the means 70 allows greater reliability and precision in the repetitive measurements of the height "h" and the setback "r" of the saddle 3 and taking said measurements quicker because the position of said saddle 3 is more precisely defined, and the position of the cyclist on the bicycle 2 is much more suitable, offering better physical performance.

The invention claimed is:

1. A positioning device for positioning the saddle of a bicycle, the saddle having a front part and a rear part, the positioning device comprising:
   a measuring pole having a first end and a second end,
   an adapter positioned at or near the first end of the measuring pole for coupling the first end of the measuring pole to the pedal crankshaft of the bicycle,
   a measuring device positioned on the measuring pole for determining the distance between a pedal crankshaft of the bicycle and the saddle,
   a positioning assembly coupled to the measuring pole and moveable along a length of the measuring pole, the positioning assembly comprising a base that includes a main plate, the base coupled to the measuring pole via an articulation assembly that permits the base and main plate to rotate with respect to the measuring pole, the main plate configured to be supported on the saddle, the base having a front stop positioned to abut the front part of the saddle when the main plate is supported on the saddle; and
   a structure that rotates with the base, the structure adapted to support or house an angle of inclination measuring device.

2. A positioning device according to claim 1, wherein the structure is comprised in the main plate.

3. A positioning device according to claim 2, wherein the main plate comprises an upper part and a lower part, the structure being comprised in the upper part.

4. A positioning device according to claim 3, wherein at least a portion of the lower part comprises a ferric material to which the angle of inclination measuring device may be magnetically attached to the main plate.

5. A positioning device according to claim 2, wherein at least a portion of the structure comprises a ferric material to which the angle of inclination measuring device may be magnetically attached to the main plate.

6. A positioning device according to claim 1, wherein the structure is a part of the articulation assembly.

7. A positioning device according to claim 6, wherein at least a portion of the part of the articulation assembly comprises a ferric material to which the angle of inclination measuring device may be magnetically attached.

8. A positioning device according to claim 6, wherein the structure comprises a substantially planar housing.

9. A positioning device according to claim 8, wherein at least a portion of the substantially planar housing comprises a ferric material to which the angle of inclination measuring device may be magnetically attached.

10. A positioning device according to claim 1, wherein the angle of inclination measuring device is a goniometer.

11. A positioning device according to claim 1, wherein the base comprises a first displacement device which allows a moving of the main plate with respect to the measuring pole in a direction of a longitudinal axis of the saddle when the main plate is supported on the saddle.

12. A positioning device according to claim 11, wherein the displacement device comprises a position indicator.

13. A positioning device according to claim 1, wherein the base comprises a rear stop and a second displacement device attached to the rear stop which allows positioning the rear stop in a direction of a longitudinal axis of the saddle to permit the rear stop to be positioned to abut the rear part of said saddle.

14. A positioning device according to claim 13, wherein the second displacement device comprises a position indicator.

15. A positioning device according to claim 1, further comprising the angle of inclination measuring device, wherein the measuring device is a digital measurement system.

16. A positioning device according to claim 1, wherein the articulation assembly comprises an L-shaped plate coupled with the measuring device, a side face of the L-shaped plate comprising the structure for supporting or housing the angle of inclination measuring device.

17. A positioning device according to claim 16, wherein at least a portion of the structure comprises a ferric material to which the angle of inclination measuring device may be magnetically attached.

18. A positioning device according to claim 1, wherein the adaptor comprises a removable and interchangeable centering apparatus that is configured to be coupled directly to a first end of the pedal crankshaft.

19. A positioning device according to claim 18, wherein the adaptor comprises a removable and interchangeable elastic member that is configured for being coupled directly to a second end of the pedal crankshaft.

20. A positioning device according to claim 1, wherein the main plate comprises an upper part comprising a plurality of striped indications which are referenced in distance to the front stop.

21. A positioning device according to claim 1, wherein the measuring pole comprises a measurement sector and an opening close to the first end for receiving a least a portion of the adapter, the measuring pole having a plurality of indications in the measurement sector referenced to in distance to the first end of the measuring pole.

22. A positioning device according to claim 21, wherein the measurement sector comprises a marked line running longitudinally along the measuring pole, the marked line being aligned with a center of the opening.

* * * * *